United States Patent [19]

Adler

[11] Patent Number: 4,939,747
[45] Date of Patent: Jul. 3, 1990

[54] DIGITAL COMMUNICATION SYSTEM WITH ADDRESSABLE REPEATERS AND DEVICES FOR FAULT ISOLATION

[75] Inventor: Klemens Adler, Eberdingen, Fed. Rep. of Germany

[73] Assignee: Standard Elektrik Lorenz AG, Stuttgart, Fed. Rep. of Germany

[21] Appl. No.: 117,595

[22] Filed: Nov. 5, 1987

[30] Foreign Application Priority Data

Nov. 8, 1986 [DE] Fed. Rep. of Germany ....... 3638147

[51] Int. Cl.$^5$ .............................................. H04B 3/36
[52] U.S. Cl. ..................................... 375/3.1; 370/13.1; 370/15
[58] Field of Search ........................ 375/3, 3.1, 4, 10; 370/13.1, 15, 16, 35, 97; 455/13, 15, 18, 2; 379/338

[56] References Cited

U.S. PATENT DOCUMENTS

| | | | |
|---|---|---|---|
| 3,950,622 | 4/1976 | Taylor | 370/13.1 |
| 4,069,402 | 1/1978 | Mantovani et al. | 370/13.1 |
| 4,072,923 | 2/1970 | Siems et al. | 370/108 |
| 4,301,538 | 11/1981 | Desombre et al. | 375/4 |
| 4,317,010 | 2/1982 | Fillot | 370/13.1 |
| 4,334,303 | 6/1982 | Bertin et al. | 455/15 |
| 4,402,075 | 8/1983 | Bargeton et al. | 370/15 |
| 4,558,464 | 12/1985 | O'Brien, Jr. | 455/2 |
| 4,573,044 | 2/1986 | McConachie et al. | 370/16 |
| 4,584,677 | 4/1986 | Kosaka | 370/15 |
| 4,611,324 | 9/1986 | Giocometti et al. | 370/97 |
| 4,638,298 | 1/1987 | Spiro | 340/425 |
| 4,713,808 | 12/1987 | Gaskill et al. | 370/93 |
| 4,831,558 | 5/1989 | Shoup et al. | 340/825.06 |

FOREIGN PATENT DOCUMENTS

0143489 6/1985 European Pat. Off. ............. 370/97
2942410 5/1981 Fed. Rep. of Germany .
3522446 8/1986 Fed. Rep. of Germany .

OTHER PUBLICATIONS

Franz R. Hubner et al.; "Zwischenregenerator fur 565-Mbit/s-Signale auf Koaxialkabeln"; Blickpunkt: Technik; Telcom Report 7 (1984) Heft 6; pp. 385–392.
W.G. Bax, J. Wagenmakers; "140 Mb/s Coaxial Transmission System 8TR 609"; Philips Telecommunication Review, vol. 37, No. 3; Aug. 1979; pp. 144–160.

*Primary Examiner*—Benedict V. Safourek
*Assistant Examiner*—Stephen Chin
*Attorney, Agent, or Firm*—Christie, Parker & Hale

[57] ABSTRACT

For a digital communication system comprising a plurality of repeaters between two terminals from one of which the repeaters are to be selectively controllable for fault-location or remote-control purposes, repeaters are disclosed each of which has its address stored unalterably in its address memory, so that the address resembles a serial number as is commonly used as an equipment identification. This saves any adjustment work during the installation of repeaters into the communication system. Also disclosed is a fault finder for such a communication system which is capable of successively interrogating the repeaters in the system for their addresses and their locations in the system, and of writing these addresses together with the associated locations into a memory. The repeaters then contain suitable devices which cooperate with this fault finder.

8 Claims, 1 Drawing Sheet

DIGITAL COMMUNICATION SYSTEM WITH ADDRESSABLE REPEATERS AND DEVICES FOR FAULT ISOLATION

TECHNICAL FIELD

The present invention relates to addressable repeaters and fault finders for a two-way digital communication system, and to a digital communication system comprising same.

BACKGROUND ART

In digital communication systems with a plurality of repeaters, devices are required which, after detection of a transmission error, permit the fault on the transmission path to be located from a terminal of the system. With respect to such fault location, a distinction is made between systems in which each repeater has an address of its own and, thus, can be controlled on a selective basis and systems with address-free fault location.

According to published German patent application No. DE-A1-29 42 410, in the systems of the first kind, a problem lies in the fact that the address of a repeater must be individually established; as a result, systems of the second kind are frequently preferred. German published Patent No. DE-C1-35 22 446 discloses a repeater for a system of the first kind which includes an address memory for a digital address. That prior art publication merely states that the address is the address assigned to the repeater, but does not disclose how and by which criterion the address is assigned to the repeater, how the addresses assigned to the repeaters are entered into the fault finder, or how the fault finder is informed where the repeater with a given address is located within the system.

DISCLOSURE OF INVENTION

The object of the present invention is to provide, for a digital communication system with repeaters having addresses, a repeater suitable with respect to address assignment and a suitable fault finder. In accordance with one aspect of the present invention, each of the repeaters has its address stored unalterably in its address memory, so that the address resembles a serial number as is commonly used as a means of equipment identification. This saves any adjustment work during the installation of repeaters into the communication system. In accordance with another aspect of the present invention, a fault finder for such a communication system is capable of successively interrogating the repeaters in the system for their addresses and their locations in the system, and of writing these addresses together with the associated locations into a memory. The repeater in accordance with the invention and the system equipped therewith have the advantage that, during installation of a repeater into the system, no address setting is necessary. The same applies to the subsequent installation of additional repeaters and to the replacement of an existing repeater by a new one. During manufacture, the repeater is provided with its address which remains with it (like a serial number) wherever it is used.

BRIEF DESCRIPTION OF DRAWINGS

The invention, will now be explained, by way of example, with reference to the accompanying drawings in which.

BEST MODE FOR CARRYING OUT THE INVENTION

Figure 1:
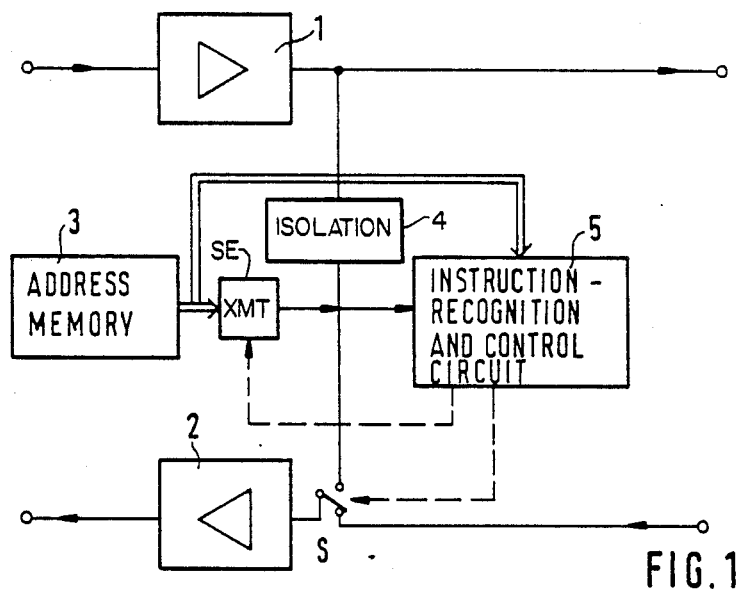
FIG. 1 is a block diagram of a repeater in accordance with the invention.

The repeater of FIG. 1 consists of two regenerators 1, 2 for the two directions of transmission, which are of the same design, and a common fault location facility. The latter has an address memory 2 for the address assigned to the repeater, which is an essential feature of the invention. In this address memory, the address is stored unalterably, so that it is inseparably linked with this repeater just as a serial number is inseparably and unalterably linked with a piece of equipment. The address is, for example, a number specific to the repeater which is represented in binary notation and is so chosen that two different repeaters never have the same number stored as their addresses in their address memory 3. The address memory 3 is a digital read-only memory, i.e., a memory in which programming of the data pattern is fixed during manufacture and cannot be changed.

In the novel repeater of FIG. 1, like in the prior art repeater, the loop can be closed by connecting the output of the regenerator 1 for one direction of transmission to the input of the regenerator 2 for the other direction of transmission by means of a controllable switch S. This connection contains an isolation network 4, which is symbolized by a transformer.

For the illustrated changeover facility for loop closure, which connects the output of the regenerator 1 to the input of the regenerator 2, it is assumed that the terminal of the system from which the loop closure or any other operation in the repeater is initiated is the terminal which transmits in the direction of the regenerator 1, i.e., which is located on the "left-hand side" of the system in the representation of FIG. 1.

An instruction-recognition and control circuit 5 is connected to the output of the regenerator 1 via the isolation network 4 and to the output of the address memory 3. It can compare the individual address stored in the address memory 3 with the address transmitted by the fault-locator associated with a remote controlling terminal and received by all repeaters, recognize the instructions transmitted from the controlling terminal, and initiate the execution of the instructions. "Instructions" as used herein means both those instructions which are transmitted in conjunction with the address of a specific repeater and are, therefore, directed only to this specific repeater, and those instructions which are transmitted without being linked with any address and are directed to all repeaters of the system. In the repeater shown in FIG. 1, which is designed for use in a two-way communication system and contains a changeover facility for loop closure, the instruction-recognition and control circuit 5, in response to a corresponding instruction, controls the switch S in such a way that it assumes the position not shown, thus closing the loop, and in response to another instruction, it controls a transmitter SE, which has its signal input connected to the address memory 3 and whose output can be connected via the switch S to the input of the regenerator 2, so that it transmits the repeater's address. Examples of how such a repeater cooperates with a fault finder in accordance with the invention, which will be explained below, will be given later.

Figure 2:
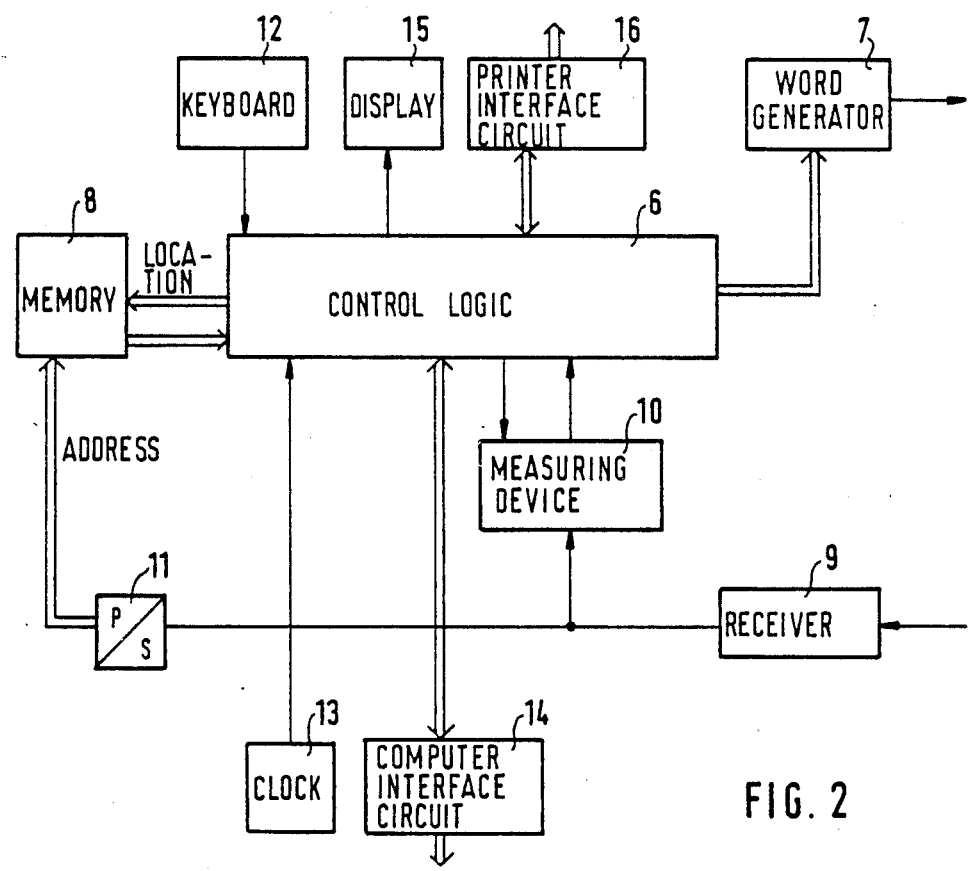
FIG. 2 is a block diagram of a fault finder in accordance with the invention.

FIG. 2 shows in block diagram form a novel fault finder for a two-way communication system with the novel repeaters shown in FIG. 1. In combination with such repeaters, this fault finder offers advantages in terms of repeater addressability and the implementation of the fault location.

The central device of the fault finder is a control logic 6 which receives information from various devices connected thereto and delivers control information for controlling various other devices. To remotely control various functions in the repeaters of the system, the fault finder transmits four different words which contain either an instruction directed to all repeaters or an instruction directed to a single repeater and connected with the address of this repeater. These words W1 to W4 have the following meanings:

| CODE | INSTRUCTION TYPE | MEANING |
|------|------------------|---------|
| W1:  | without address (to all repeaters) | send out address. |
| W2:  | with address (to only a single repeater) | close loop. |
| W3:  | with address (to only a single repeater) | assume stand-by state. |
| W4:  | without address (to all repeaters) | assume operating state. |

These instructions are generated and transmitted by a word generator 7 controlled by the control logic 6.

The fault finder of FIG. 2 cooperates with the repeater of FIG. 1 as follows. When the fault finder is connected to the terminal, it first has no information as to which addresses the repeaters of the system have and which repeater occupies which location along the transmission path. Therefore, the fault finder is first unable to control the repeaters on a selective basis.

To obtain the location and address information necessary for this purpose, the fault finder contains devices according to the invention which will be described with the aid of FIG. 2. These devices enable the fault finder to successively interrogate the repeaters for their addresses in their local order in the system, and store these addresses in a memory together with the locations of the repeaters. This can be done in a so-called initialization phase, which is performed either only once upon the initial start-up of the fault finder, or (initiated manually or by a clock or by remote control from a computer) from time-to-time.

The control logic 6 is connected to a memory 8 into which may be entered data concerning the address of a repeater and its position within the system. In the memory 8, these two items of information are associated with each other, so that the memory contains the information that a repeater has the digital address XYZ and, viewed from the fault-locating terminal, is, for example, the fifth of the consecutive repeaters of the system. If, after an interrogation operation (described in detail below), any of the repeaters of the transmission path sends its address to the fault finder, this address is received by a receiver 9 having its output connected to a measuring device 10 and a serial-to-parallel converter 11. When the control logic 6 sends an instruction to the repeaters to transmit their addresses, the measuring device receives a trigger signal from the control logic. Thus, when the receiver 9 receives an address, the measuring device can measure the time elapsed between the transmission of the interrogation instruction and the arrival of this address. The measuring device passes this propagation time delay to the control logic 6, which determines from the delay that it was a repeater with a given location from which the address was received (The repeaters of the system follow one after the other at approximately regular intervals.) After this evaluation of the received address, the serial-to-parallel converter 11 writes the address into the memory 8, and at the same time, the control logic transfers the location information for the associated repeater (derived by the control logic 6 from the measured time delay) into this memory. In the memory 8, the address is stored together with the associated location.

The repeaters are interrogated for their addresses as follows. In response to a signal from a keyboard 12 connected to the control logic 6 or automatically depending on the time of a clock 13 connected to the control logic 6 or under remote control from a computer interface circuit 14, the control logic 6 starts the interrogation process. It causes the word generator 7 to send out the word W1 in order to request all repeaters to send their addresses back to the fault finder. Each repeater recognizes this word in its instruction-recognition and control circuit 5 (FIG. 1), which reverses the switch S to close the loop, and immediately thereafter causes the transmitter SE to transmit the address stored in the address memory 3 via the regenerator 2 toward the fault finder. However, since, in this state, only the first repeater (viewed from the fault-locating terminal) is connected to this fault-locating terminal, and the transmission path from the repeaters located behind the first repeater to the fault-locating terminal is open in the respective preceding repeater because the loop is closed there, only the address transmitted by the first repeater will reach the fault finder.

In the fault finder, the propagation time delay is measured for the address, the location of the address-transmitting repeater is determined therefrom, and the received address is stored together with the location of the repeater in the memory 8. The control logic 6 then causes the word generator 7 to transmit the word W3 to the repeaters in connection with the address just received and stored. The instruction-recognition and control circuit 5 of the first repeater recognizes the address from the fault finder as its own address and the word W3, and assumes the stand-by state. This means that it restores the switch S to the position chosen in FIG. 1, thus opening the loop in the first repeater and connecting this repeater to the second repeater; the instruction-recognition and control circuit 5 maintains this connection even if it receives the word W1 (instruction to transmit address) again. In the stand-by state, a repeater thus ignores the reception of the word W1, the word W2, and the word W3, and remains unchanged. Only the word W4, which instructs all repeaters together to assume the operating state, will terminate the stand-by state of a repeater.

After the first repeater has been put in the stand-by state, the word generator of the fault finder transmits the word W1 to all repeaters. The first repeater, which is in the stand-by state, ignores this instruction, and its switch S remains in the position shown in FIG. 1, in which the repeater is connected to the repeater lying behind it. Those lying behind it respond to the word W1 as described above, namely by closing the loop and transmitting their addresses via their regenerators 3 toward the fault finder. At that instant, however, only the second repeater is connected via the first repeater to the fault finder, while the repeaters behind the first repeater are cut off from the transmission path to the fault finder, i.e., send their addresses "into emptiness," because the loop in the respective preceding repeater is closed. The address of the second repeater is now received in the fault finder and is written together with the associated location into the memory 8 as was described above for the address of the first repeater. The word generator 7 of the fault finder then sends out the word W3, which is provided with the address of the second repeater and causes the latter to assume the stand-by state.

In this manner, all repeaters are successively interrogated for their addresses, and the addresses are stored together with the associated locations in the memory 8 until the interrogation reaches the terminal following the last repeater. When this terminal receives the word W1, it closes a loop, too, and responds with a word which informs the fault finder that all repeaters have been interrogated. Thus, the fault finder need have no information as to how many repeaters there are on the transmission path between the two terminals. After receipt of this word, the fault finder transmits the word W4 via its word generator 7. This word puts all repeaters and the distant terminal in the operating state, in which the switch S is in the position shown in FIG. 1 and in which, unlike in the stand-by state, the instruction-recognition and control circuit 5 will execute any newly received instruction to close the loop.

The instruction-recognition and control circuit 5 will effect "forced resetting" to the operating state, regardless of whether or not it has received the word W4, if it has received none of the words W1 to W3 for a predetermined period of time, e.g., 10 seconds. The forced resetting ensures that any erroneous loop closure in any of the repeaters is undone after a short time, so that in the operating state, the transmission can be disturbed only for a short time.

The words W1 to W4 are n-bit words in which the instruction is contained with sufficient redundancy for error protection.

Knowing the addresses and locations of the repeaters, the fault finder is in a position to perform measurements at any time in order to test the quality of the transmission path from the fault-locating terminal to any of the repeaters by closing the loop in any of the repeaters under remote control, transmitting a test pattern, and comparing the test pattern returning to the fault finder via the closed test loop with the transmitted test pattern to measure the bit error rate, for example. To indicate test results, the fault finder contains a display 15, which is connected to the control logic 6, and a printer interface circuit 16, also connected to the control logic 6, which permits test records to be printed out by a printer. If the loop is to be closed in a specific repeater anywhere on the transmission path to perform a measurement, the word generator will transmit the word W2 in connection with the address of this repeater, so that the loop will be closed. During the measuring operation, the word W2 is repeatedly inserted into the transmitted test pattern to prevent activation of the above-described forced resetting to the operating state. After the end of the measurement, the word W4 is sent out to restore all repeaters to the operating state.

If the transmission paths to consecutive repeaters are to be tested successively, the fault finder will send the word W2 to the first repeater to test the transmission path to this repeater, then the word W3 to this repeater, then the word W2 to the second repeater, then, after the end of the test of the transmission path up to this second repeater, the word W3 to this repeater, etc., until the transmission paths to all repeaters has been tested, whereupon the word W4 is sent out, which terminates the whole test and restores all repeaters to the operating state unless this has already been effected by forced resetting.

The present invention has been described above with regard to the structure, function and use of a specific embodiment of the invention in which the repeater shown in FIG. 1 cooperates with the fault finder shown in FIG. 2 in a two-way communication system.

In one possible alternative embodiment, the repeater is present for only one direction of transmission and has an address unalterably stored therein, so that no address need be set at the repeater during its installation into a communication system. The address, the repeater's serial number, so to speak, and possibly the repeater's location in the system are then included in a plan and entered according to the plan into a fault finder or a remote-control unit at a central location. In that case, too, the repeater has an instruction-recognition and control circuit which will recognize generally valid instructions linked with the repeater's address and initiate their execution, such as turn-on and -off or increase or decrease of the gain. A fault finder as shown in FIG. 2 cannot be used for lack of a backward channel and it will be necessary for a receiving terminal to cooperate with a transmitting terminal to determine which repeater is not fully functional.

It should be appreciated by those skilled in the art that many other modifications and variations are possible. Accordingly the exclusive rights afforded hereby should be broadly construed, limited only by the spirit and scope of the appended claims.

What is claimed is:

1. A digital two-way communication system comprising two terminals and a plurality of repeaters connecting said terminals, wherein
   at least one of said terminals comprises a fault finder, each said repeater comprises
      a read-only memory for providing a digital repeater address which is an equipment-specific number which distinguishes its associated repeater from other repeaters of the same series of the same design,
      a remotely controllable changeover facility for loop closure,
      a transmitter for transmitting said address and an instruction-recognition and control circuit connected to said loop changeover facility and to said transmitter and responsive to control signals from said fault finder for closing the loop to said at least one terminal and transmitting said address, and
   said fault finder comprises
      a fault finder memory and
      fault finder control means for, in a sequence corresponding to the physical order of the repeaters, activating the repeater's changeover facility, interrogating the repeater for its address and storing said address, together with an indication of said physical order, in said fault-finder memory.

2. A two-way communication system as claimed in claim 1, wherein
   a control means comprises a control logic circuit, a control output generator controlled by the control logic circuit and serving to transmit addresses and instructions in connection with the interrogation, a receiver for receiving addresses transmitted by the repeaters and a measuring device for determining the physical distance of the repeater transmitting an address, and said fault finder further comprises initialization means connected to the control logic circuit for initiating the interrogation and storage processes.

3. A repeater for a digital communication system, said repeater comprising a read-only memory for providing an equipment-specific digital address which distinguishes its associated repeater from other repeaters of the same series of the same design, a remotely controllable changeover facility for loop closure, a transmitter for transmitting said digital address, and an instruction-recognition and control circuit connected to said loop changeover facility and to said transmitter and responsive to control signals from a remote fault finder for closing said loop and transmitting said address.

4. A fault finder for a digital two-way communication system comprising a physically ordered plurality of repeaters each having address means for providing a unique fixed digital address that is fixed prior to the installation of the repeater and that is unrelated to the repeater's physical order in the system and a remotely controllable changeover facility for loop closure, said fault finder comprising:

a fault finder memory, and fault finder control means for successively, in a sequence corresponding to the physical order of the repeaters, activating each repeater's changeover facility and interrogating the repeater for its said unique fixed digital address and storing said addresses, together with a separate indication of said physical order, in aid fault-finder memory.

5. A fault finder for a digital two-way communication system comprising a physically ordered plurality of repeaters each having address means for providing a unique digital address unrelated to the repeater's physical order in the system and a remotely controllable changeover facility for loop closure, said fault finder comprising:

a fault finder memory, and fault finder control means for successively, in a sequence corresponding to the physical order of the repeaters, activating each repeater's changeover facility and interrogating the repeater for its address and storing said addresses, together with an indication of said physical order, in said fault-finder memory, wherein said fault finder control means comprises a control logic circuit, a control output generator controlled by the control logic circuit and serving to transmit addresses and instructions in connection with the interrogation, a receiver for receiving addresses transmitted by the repeaters and a measuring device for determining the physical distance of the repeater transmitting an address, and said fault finder further comprises initialization means connected to the control logic circuit for initiating the interrogation and storage processes.

6. A fault finder as claimed in claim 5,
wherein
said initialization means is manually operated.

7. A fault finder as claimed in claim 5,
wherein
said initialization means is automatically controlled.

8. A fault finder as claimed in claim 5,
wherein
said initialization means is remotely controlled.

* * * * *